Sept. 21, 1926.
G. T. R. HILL
CONTROL SURFACES FOR AEROPLANES
Filed March 10, 1926   4 Sheets-Sheet 4
1,600,671
—FIG.10.—
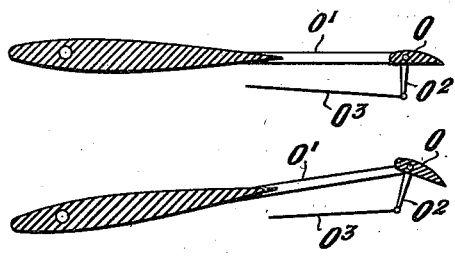
—FIG.12.—
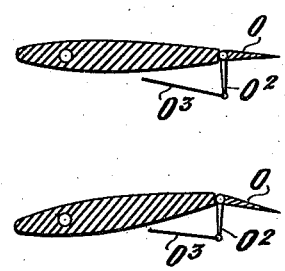
—FIG.11.—
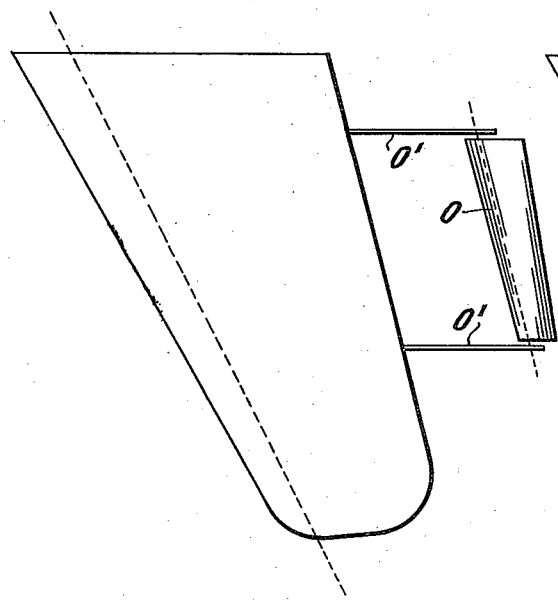
—FIG.13.—
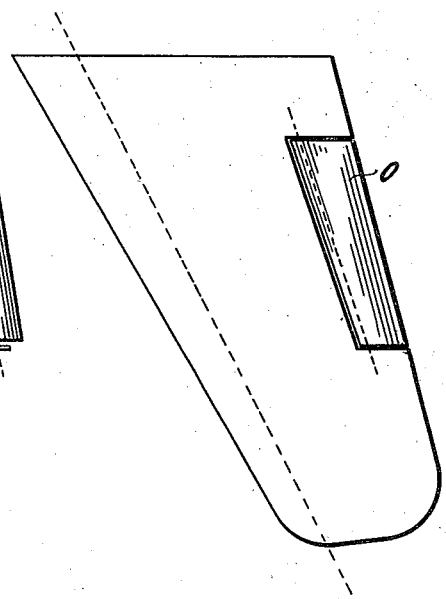
Geoffrey T. R. Hill
Inventor Patented Sept. 21, 1926.

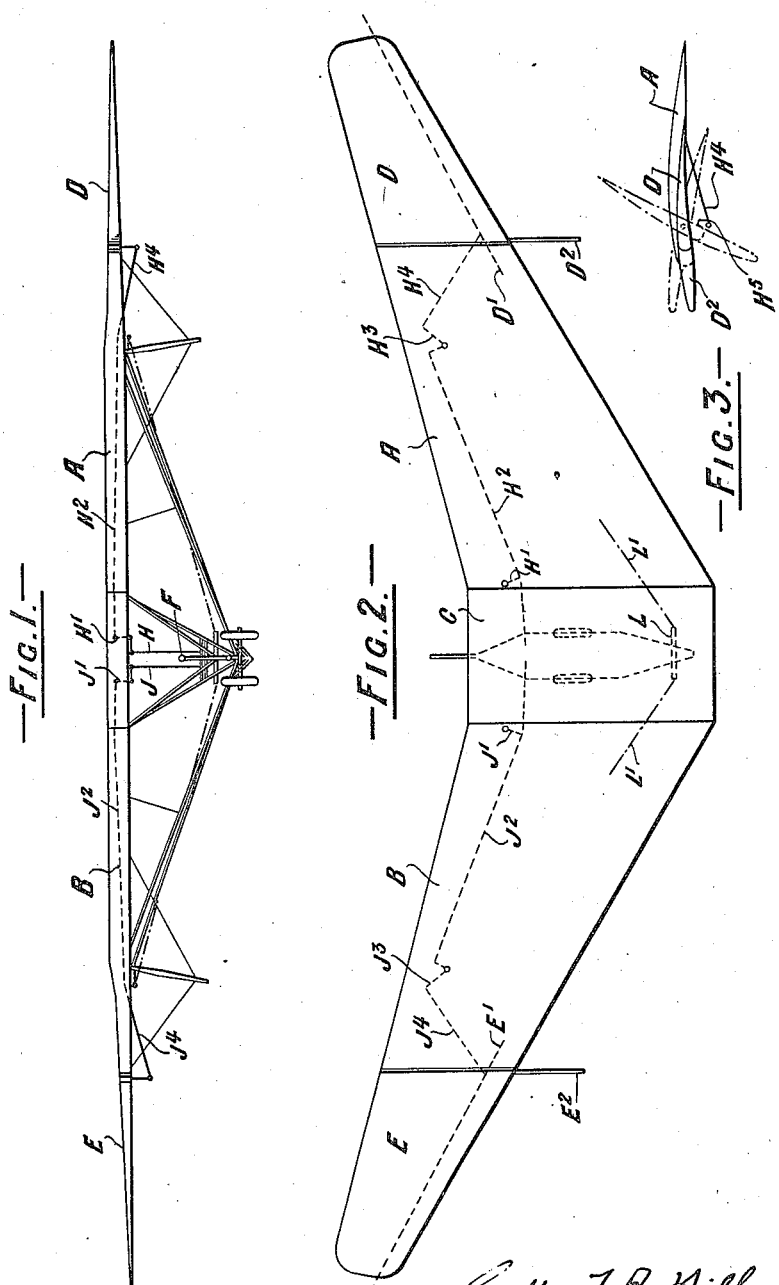

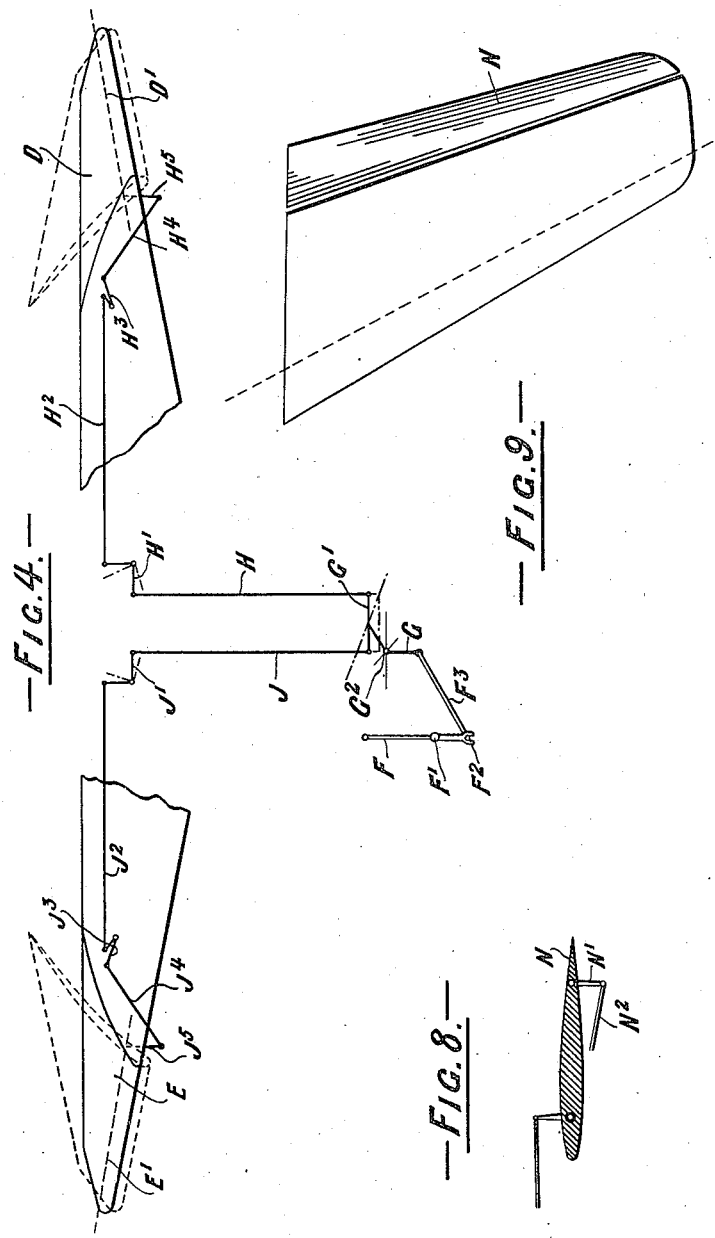

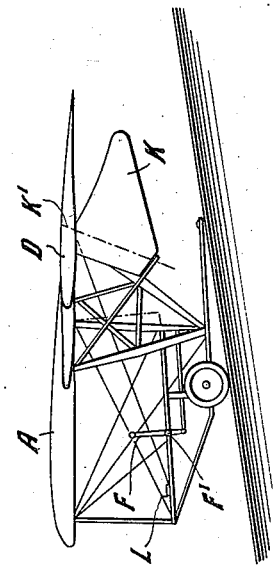
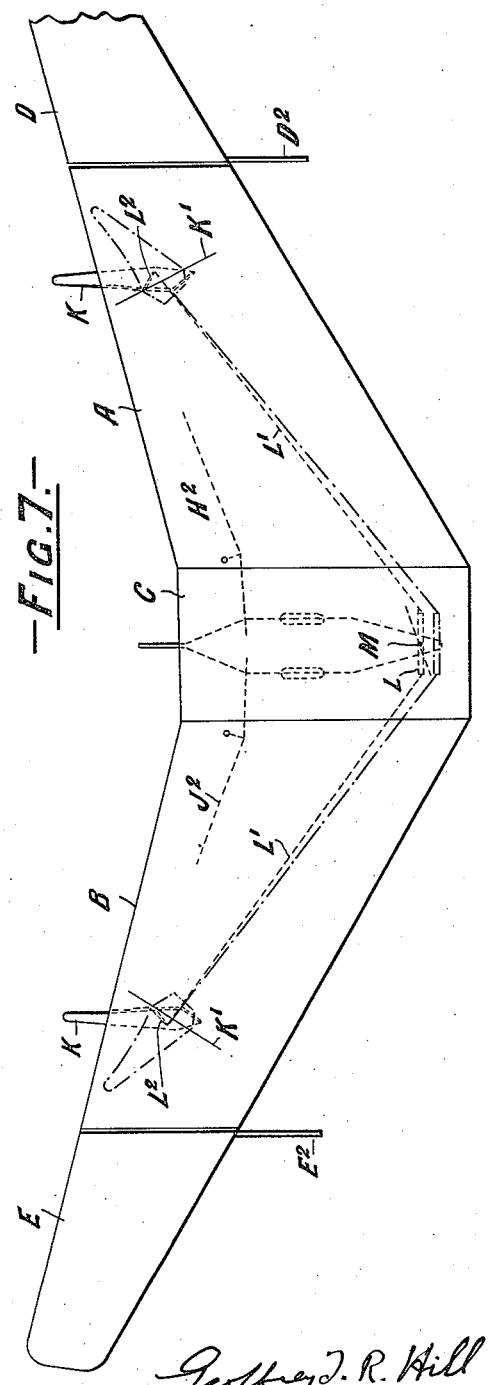
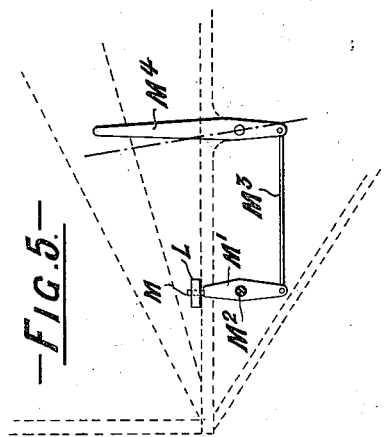

1,600,671

UNITED STATES PATENT OFFICE.

GEOFFREY TERENCE ROLAND HILL, OF BROOKWOOD, ENGLAND.

CONTROL SURFACES FOR AEROPLANES.

Application filed March 10, 1926, Serial No. 93,674, and in Great Britain September 29, 1924.

The object of this invention is to provide apparatus which will permit aeroplanes to be controlled over a large range of flying angles, including the larger angles of incidence where under ordinary conditions the machine would become stalled and out of control.

The invention comprises the employment of controlling surfaces (hereinafter termed controllers) angularly adjustable about lateral axes and situated in free air, not following wing surfaces. The axes of the controllers are located behind the centre of pressure of the total supporting area of the wing surfaces, and the said controllers are provided with means for their mutual adjustment in angle and also for differential control in their relative angles. The free location of these controllers, namely not following fixed surfaces, and the mutual and differential control of the angles of such controllers, permit the said controllers to maintain effective flying angles and to be adjusted relatively to the main wing and to each other, in order to maintain the balance and control of the machine without regard to the angle of incidence to the air at which the main wings may be.

The invention is especially suitable for application to that type of aeroplane which has its main wings swept back, preferably tapered in plan form, and washed out in incidence towards the wing tips. In this type there is no tail plane or elevator behind the body which is preferably short. The object of the wash-out in incidence towards, and the sweep-back of, the wing tips is to reduce the movement of the centre of pressure of the main wing or wings. The wing section may also be varied along the span. The reduction of movement of the centre of pressure is desirable in order that the flying angles of the controllers required for balance may be as small as possible, thus leaving available the maximum possible movement of the controllers for controlling the aeroplane. Instead, however, of applying flaps or ailerons following the outer ends of the main wings for the purposes of control, the controllers which project laterally beyond the wings are used for this purpose.

Owing to the sweep-back, the controllers are behind the centre of gravity of the aeroplane, and any change in the sum of the lifts on both the controllers produces a couple about a transverse axis through the centre of gravity, resulting in the pitching of the aeroplane. Again, any difference between the lifts on the two controllers produces a couple about a longitudinal axis along the line of flight, resulting in the rolling of the aeroplane.

The changes in lift required for the pitching control are produced by rotating both the controllers together, and the differences in lift required for the rolling control may be produced either by rotating both controllers in opposite directions, or by rotating flaps hinged to the back of the controllers in opposite directions.

The controllers, being situated beyond the main wings of the machine, are in comparatively free air, and little influenced by the air passing such wings, consequently, the controllers, never being stalled, may be used for controlling the flight of the aeroplane even when the main wings are stalled, and when ailerons attached to the trailing edge of such wings would also be stalled.

The axis of rotation of each controller is slightly in advance of the location of the centre of pressure when the said controller is travelling through the air at efficient flying angles.

The means for giving the required angular adjustment to these controllers may be two separate means, or may be combined means such as a "joy stick", in which say the fore and aft movements impart downward and upward inclination respectively simultaneously to both controllers, and lateral movements to right and left impart differential adjustment, namely, upward adjustment to one controller and downward adjustment to the other, and vice versa.

The rudders of the machine which are preferably single-acting may be mounted below the fixed wings as far as may be conveniently arranged from the centre of the aeroplane, and they may if mechanical means permit be mounted on the controllers in order to increase their distance from the centre of the machine. The direction of angular adjustment of the rudders is outwards at their trailing edges, and they are preferably balanced to a certain degree by being pivoted at a suitable distance behind the leading edge. The rudders may be operated one at a time to secure a turning moment, and together to act as an air brake.

Air brakes or resistance surfaces may be provided on each wing in addition to the rudders, thus dividing the duty of ruddering and braking between the rudders and brakes instead of combining these duties as in the particular means described.

It has already been proposed on monoplanes having wings stretching laterally at right angles to the longitudinal axis, to pivot single ailerons and biplane ailerons on the ends of the wings and coaxial with each other, but in such arrangements as hitherto proposed the axes of the pivoted ailerons have not been located behind or at a sufficient distance behind the centre of pressure to permit of a pitching couple being obtained by their mutual adjustment in the same direction.

Ailerons or flaps hinged to the trailing edges of wings, have also been located behind the centre of pressure of the total supporting area of the wing surfaces, and these have been adjustable together and in opposite directions, but as all such ailerons or flaps immediately follow fixed wing surfaces, when the wings are stalled the ailerons or flaps are useless for controlling either rolling or pitching moments.

The invention will be further described with reference to the accompanying drawings, which illustrate an example of construction of a monoplane or glider constructed according to this invention. It is of course obvious that an engine and propellers may be fitted to such a machine.

Fig. 1 is a front elevation, and Fig. 2 a plan view of the machine. Fig. 3 is an end view of the main wing and controller, and Fig. 4 is a diagram showing a means for moving the controllers. Fig. 5 is a side elevation of the machine. Fig. 6 is a plan view of the machine illustrating rudders and means for operating them, and Fig. 7 is a detail view showing means for adjusting the position of the rudder bar.

Fig. 8 is a section and Fig. 9 a plan view of a controller fitted with an independently operated flap, Fig. 10 illustrates a controller in two positions with a relay for operating it, Fig. 11 being a plan of the controller fitted with this relay.

Figs. 12 and 13 are similar views of Figs. 10 and 11, with the relay attached directly to the controller and forming part thereof.

In the example of construction illustrated, the wings A and B are arranged to project to port and starboard from a central portion C, all forming a continuous wing, the portions A and B being swept back and of somewhat tapered form. At the ends of the wings A and B port and starboard controllers D and E are fulcrumed on the axes $D^1$ and $E^1$, about which they may be turned together in the same direction of angular adjustment, or in opposite directions, as may be required. The controllers D and E may have, as shown in the drawings, forward extensions $D^2$, $E^2$ which are weighted to assist in balancing the controllers D, E. The controllers D, E are adjusted in angle by a joy stick F mounted on a universal joint $F^1$ and carrying a hinge joint $F^2$ at its base, connecting with the forward end of a connecting rod $F^3$. The after end of the connecting rod $F^3$ is hinged to a bell-crank lever G, having a cross head $G^1$ on its after end and fulcrumed on a universal joint $G^2$. This mechanism causes forward and backward movements of the joy stick F to raise and lower the cross head $G^1$, while rocking movements of the joy stick F to port and starboard will rock the cross head in opposite directions, and move the ends of the cross head vertically in opposite directions. The port end of the cross head $G^1$ is connected by a connecting rod H to a bell-crank lever $H^1$, the other arm of which is connected by a connecting rod $H^2$ to a bell-crank lever $H^3$, the other arm of which is connected by a connecting rod $H^4$ with an arm $H^5$ depending from the controller D to which it is attached. Similar connecting parts J, $J^1$, $J^2$, $J^3$, $J^4$ and $J^5$ connect the starboard end of the cross head $G^1$ with the starboard controller E.

Through the above described connections, the fore and aft movements of the joy stick F will cause both the controllers D and E to be rotated simultaneously in the same direction to raise or lower their trailing edges, while a rocking of the stick F to port or starboard will rotate the controllers simultaneously in opposite directions, that is to say, while the trailing edge of one of the controllers is raised, the trailing edge of the other controller will be lowered.

It is necessary for the effective working of the controllers D, E that they should be of greater area than is generally the case with ailerons on ordinary machines. The effective lateral control is of course greater with the greater distance from the longitudinal axis, and such area of the controllers, so far as experiments have hitherto indicated, should preferably have an area of not less than one-tenth of the fixed wing surface. In addition, the controllers should be preferably of such area and span that they neutralize, or nearly neutralize, the maximum unstable auto rotating couple due to the main wing or wings, which occurs beyond the stalling point. This couple, and therefore the requisite size of the controllers, depends on the characteristics of the wing sections used along the span of the main wing or wings.

Referring more particularly to Figs. 5, 6 and 7, rudders K, K are mounted upon axes $K^1$, $K^1$ beneath the port and starboard portions A, B of the wings, and are spaced as far as may be conveniently arranged from the centre of the machine. The axes $K^1$, $K^1$ are at some distance behind the leading edges of the rudders K, K, and assist in balancing the rudders to a certain degree.

The rudders K, K are operated and controlled by the rudder bar L connected by links L¹ to outstanding arms L² fixed to the rudders, and the rudder bar L is carried on a centre pivot M which is capable of being moved forwardly when required.

The pivot M of the rudder bar may be carried, as shown at Fig. 7, by a two-armed lever M¹ pivoted at M² to the framework of the machine and connected by a link M³ with a hand lever M⁴.

When the rudders K, K are to be operated for steering or turning, the rudder bar is moved angularly about its pivot M, but when required to use the rudders as an air brake, the rudder bar is moved forwardly by means of the hand lever M⁴, link M³ and lever M², which has the effect through the connections L¹, L² of turning both rudders outwardly simultaneously, as indicated in dotted lines at Figure 6, and when in this position control is secured by angular movements of the rudder bar as before, when the angle of one rudder will be reduced while the angle of the other rudder is increased. When the rudders acting as an air brake are both turned fully outwards, rudder control is maintained solely by reducing the angle of one rudder.

Referring particularly to Figs. 8 and 9, N is a flap which is hinged to the trailing portion of the controller, and operated by a separate lever. This separation of the flaps from the functions of the controllers enables the rolling moment to be controlled without necessarily adjusting the controllers themselves. The flap N is actuated by an arm N¹ and connecting rod N².

In adjusting such large controllers it may be advantageous to employ a relay, such as an auxiliary hinged trailing edge to each controller, and so relieve the pilot of unnecessary work in the adjustment of the said controllers.

Examples of these relays are illustrated in Figs. 10 and 11. In such arrangements the controllers are mounted to rotate freely on their pivots, and the angular position of the controllers is regulated by a relay O, which in the instance shown at Figs. 10 and 11 is carried on the ends of booms O¹, and the said relays are controlled in angle by means of arms O² and connecting rods O³. The two positions shown in Fig. 10 illustrate how by giving angular movement to the relay O by means of its arm O² and connecting rod O³, the controller is caused to turn upon its axis and change its attitude, no separate control levers being required. Relays could of course be used merely to supplement the direct operation of the controllers.

Figs. 12 and 13 illustrate similar relays which, however, are attached directly to the controllers. In this case the booms O¹ are dispensed with.

Although this invention has been described as applied to a machine of the type without a tail, it is evident that the invention may equally well be applied to machines with tails, providing the whole of the horizontal tail surface can be rotated through larger angles than are commonly used, to prevent its becoming stalled and ineffective as an organ of control.

In the operation of machines constructed according to this invention, since a steep glide at low speed is possible without loss of control, landings may be effected in very confined spaces, and as the angle of descent cannot be substantially modified immediately prior to landing, it may be necessary in some instances to employ under-carriages capable of absorbing the vertical component of the velocity of the aeroplane, whatever the angle of descent.

Although the axes of the controllers are illustrated as following the angle of swept back wings, they may be coaxial or have their axes set at some intermediate or other mutual angle to the longitudinal axis of the machine.

What I claim as my invention and desire to secure by Letters Patent is:—

1. An aeroplane having laterally extending fixed wing surfaces, in combination with controllers located laterally in free air not preceded by wing surfaces and pivoted about lateral axes located behind the centre of pressure of the total supporting area of all the wing surfaces, such controllers being capable by themselves of effectually controlling the aeroplane, and means for adjusting the controllers in angular relation to the fixed wing surfaces.

2. An aeroplane having laterally extending fixed wing surfaces, in combination with controllers located laterally in free air not preceded by wing surfaces and pivoted about lateral axes located behind the centre of pressure of the total supporting area of all the wing surfaces, such controllers being capable by themselves of effectually controlling the aeroplane, means for adjusting the controllers in similar angular directions, and means for adjusting the controllers in opposite angular directions.

3. An aeroplane having laterally extending fixed wing surfaces, in combination with controlers located laterally in free air not preceded by wing surfaces and pivoted about lateral axes located behind the centre of pressure of the total supporting area of the wing surfaces, means for adjusting the controllers in similar angular directions, means for adjusting the controllers in opposite angular directions, variable resistance surfaces located on the port and starboard surfaces and means for adjusting such resistance surfaces.

4. An aeroplane having laterally extending fixed wing surfaces, in combination with controllers located laterally in free air not preceded by wing surfaces and pivoted about lateral axes located behind the centre of pressure of the total supporting area of the wing surfaces, means for adjusting the controllers in similar angular directions, means for adjusting the controllers in opposite angular directions, variable resistance surfaces mounted on vertical axes and means for angularly adjusting such surfaces in lateral directions.

5. An aeroplane having laterally extending fixed wing surfaces, in combination with controllers located laterally in free air not preceded by wing surfaces and pivoted about lateral axes located behind the centre of pressure of the total supporting area of all the wing surfaces, such controllers being capable by themselves of effectually controlling the aeroplane, and means for adjusting the controllers in angular relation to the fixed wing surfaces, comprising bracket and link connections between the controllers and a two movement control operating gear.

6. An aeroplane having laterally extending fixed wing surfaces, in combination with controllers located laterally in free air not preceded by wing surfaces and pivoted freely on lateral axes located behind the centre of pressure of the total supporting area of all the wing surfaces, such controllers being capable by themselves of effectually controlling the aeroplane, relays carried behind the controllers and means for adjusting the relays in similar angular directions, and means for adjusting the said relays in opposite angular directions.

7. An aeroplane having laterally extending fixed wing surfaces, in combination with controllers located laterally in free air not preceded by wing surfaces and pivoted about lateral axes located behind the centre of pressure of the total supporting area of all the wing surfaces, such controllers being capable by themselves of effectually controlling the aeroplane, means for adjusting the controllers in similar angular directions, means for adjusting the controllers in opposite angular directions, flaps hinged to the trailing edges of the controllers, and means for adjusting the angular positions of the flaps.

In witness whereof I have hereunto set my hand.

GEOFFREY TERENCE ROLAND HILL.